United States Patent Office 3,795,633
Patented Mar. 5, 1974

3,795,633
RECOVERY OF THERMOPLASTIC FOAM
Amos Golovoy, Westland, and Robert H. Beck, Jr., Dearborn, Mich., assignors to Ford Motor Company, Dearborn, Mich.
No Drawing. Filed Dec. 17, 1971, Ser. No. 209,344
Int. Cl. C08f 47/24
U.S. Cl. 260—2.3                                    7 Claims

ABSTRACT OF THE DISCLOSURE

A method for converting scrap thermoplastic foam to useful material comprises particularizing said scrap, passing the particulate scrap through a vented and heated extruder to which a vacuum of between 0 and 140, preferably between 5 and about 50 mm. Hg is applied to yield a non-porous, essentially void-free, solid resin. In a preferred embodiment, the particularized scrap is mixed with about 5 to about 50 weight percent virgin resin pellets prior to extrusion.

BACKGROUND OF THE INVENTION

An extensive use of thermoplastic foam for protection of manufactured goods against damage during transportation has resulted in a disposal problem and a waste of useful materials. Disposal to date has been largely by burying and incineration. With a growing premium on landfill areas, burying is becoming increasingly unacceptable. The air pollution possibilities of large scale incineration are even less to be desired.

THE INVENTION

A method is here provided for converting a troublesome waste problem to a valuable commercial product. The method of this invention is to convert scrap thermoplastic foam, e.g., polystyrene foam, ABS (acrylonitrile-butadiene-styrene copolymer) foam, polyethylene foam, etc., into a continuous, i.e., void-free, solid, usable resin using an extruder which has at least one decompression zone to which vacuum is applied. With the materials of principal concern, this can be effected by maintaining in the extruder a maximum temperature in the range of about 300° to about 425° F. more commonly in the range of about 325° to about 400° F. The invention is practiced with a vacuum applied to the decompression zone of the vented extruder which is between 0 and 140 mm. Hg, commonly between about 5 and about 50 mm. Hg. The foam is first heat converted to molten resin in the extruder and then passed through at least one decompression zone as liquid resin wherein gas removal from the liquid resin is effected.

After void removal by extrusion, the extrudate is cooled. It can then be pelletized or pulverized. It is then ready to be molded by any conventional molding process, e.g., compression, injection, extrusion, etc., to form toys, containers and many other plastic items.

Prior to extrusion, the scrap is advisedly particularized by grinding or other suitable method to average particle diameters below about 5/8 inch, preferably in the range of about 1/32 to about 1/2 inch.

It has been found that higher extrusion output and better resin quality are obtained when about 5 to about 50 parts by weight virgin resin pellets are premixed with about 95 to about 50 parts by weight of the particulate scrap foam prior to its entry into the extruder.

This invention will be more easily understood from the following examples.

EXAMPLE 1

Sheets of polystyrene foam with density of 6 lbs./ft.$^3$ are ground to 1/8 inch diameter particles. The ground foam is passed through a conventional vented extruder. The screw is 1 inch diameter, the ratio of length to diameter is 25/1 and the compression ratio is 5. The extrusion conditions are as follows:

| | |
|---|---|
| Speed _____r.p.m__ | 60 |
| 1st zone temperature (entrance) _____° F__ | 325 |
| 2nd zone temperature _____° F__ | 335 |
| 3rd zone temperature _____° F__ | 335 |
| Die temperature (exit) _____° F__ | 325 |
| Pressure of decompression zone _____mm. Hg__ | 750 |

Output of the styrene resin is about 1.5 lbs./hour. The resin is free of observable bubbles. Density of extruded resin is about 1.06. The extrudate is pelletized and then compression molded at 380° F. and a pressure of 2,000 p.s.i. to form a sheet measuring 12 x 12 x 1/8 inches.

EXAMPLE 2

The ground foam of Example 1 is mixed with 50 weight percent of virgin polystyrene pellets. The mixture is extruded using the same conditions used in Example 1. Output increases to about 1.9 lbs./hour and the density of the extrudate is about 1.08. The extrudate is pelletized and then injection molded. The molded parts have good surface finish and are completely free of observable bubbles (voids). Mechanical properties of the molded parts are:

| | |
|---|---|
| Tensile strength _____p.s.i__ | 7,000 |
| Tensile modulus _____p.s.i__ | $5 \times 10^5$ |
| Elongation-to-break _____percent__ | 1.2 |

EXAMPLE 3

The ground foam of Example 1 is mixed with 10 wt. percent of $TiO_2$. The mixture is extruded at the same conditions as in Example 1 except that vacuum of 50 mm. Hg is applied to the vented extruder. The extrudate is free of observable voids. Output rate is about 1.6 lbs./hour. The extrudate is pelletized and then injection molded at 400° F. and a pressure of about 15,000 p.s.i. Molded parts have excellent surface finish and good pigment dispersion.

EXAMPLE 4

Sheets of ABS (acrylonitrile, butadiene, styrene copolymer) foam with density of 33 lbs./ft.$^3$ are ground to 1/8 inch particles. The ground foam is extruded in a vented extruder described in Example 1. The following conditions are used:

| | |
|---|---|
| Speed _____r.p.m__ | 80 |
| 1st zone temperature _____° F__ | 350 |
| 2nd zone temperature _____° F__ | 400 |
| 3rd zone temperature _____° F__ | 400 |
| Die temperature _____° F__ | 350 |
| Output _____lbs./hour__ | 3.5 |

A vacuum of 10 mm. Hg is applied to the vent. The extrudate is found to be free of observable voids and has a density of about 1.05.

The extrudate is pelletized and then molded in an injection molding machine. Molded parts are free of voids and have good surface finish.

EXAMPLE 5

Sheets of polyethylene foam with density of 4 lbs./ft.$^3$ are chopped and extruded through a vented extruder as in Example 1. The extrusion conditions are as follows:

| | |
|---|---|
| Speed _____r.p.m__ | 80 |
| 1st zone temperature _____° F__ | 300 |
| 2nd zone temperautre _____° F__ | 350 |
| 3rd zone temperature _____° F__ | 350 |
| Die temperature _____° F__ | 300 |
| Output _____lb./hour__ | 1.0 |
| Vacuum _____mm. Hg__ | 50 |

The extrudate is free of observable voids and has a density of about 0.91. The extrudate is pelletized and then molded in an injection molding machine. The molded articles are free of observable voids and have good surface finish.

EXAMPLE 6

The procedure of Example 1 is repeated except that the decompression zone is maintained at atmosphere pressure and the screw speed is 120 r.p.m. The resin output is increased to about 2.7 lbs./hour and the extrudate reveals observable bubbles. The density of this extrudable is in the range of 0.8–0.9.

This procedure is repeated except for the difference that a vacuum of 25 mm. Hg is impressed on the decompression zone. The extrudate is free of observable bubbles and the extrudate has a density of about 1.07.

It will be understood by those skilled in the art that modifications can be made in the foregoing illustrative examples while remaining within the scope of the invention as set forth in the appended claims.

What is claimed is:

1. A method for converting thermoplastic foam which comprises particularizing said foam to average particle diameter below about 5/8 inch, passing the resultant particulate thermoplastic foam through a vented extruder wherein said partciulate thermoplastic foam is heat converted to molten resin and thereafter passed through at least one decompression zone wherein a pressure between 620 and 755 mm. Hg is impressed upon said molten resin, and extruding the resultant essentially void-free solid resin, the maximum temperature within said extruder being in the range of about 300° to 425° F.

2. The method of claim 1 wherein said temperature is in the range of about 325° F. to about 400° F.

3. The method of claim 1 wherein said pressure in said decompression zone is in the range of about 710 to about 755 mm. Hg.

4. The method of claim 1 wherein about 5 to about 50 parts by weight of particulate virgin resin is mixed with about 95 to about 50 parts by weight of said particulate foam prior to its entry into said extruder.

5. The method of claim 1 wherein said thermoplastic foam is polystyrene foam.

6. The method of claim 1 wherein said thermoplastic foam is acrylonitrile-butadiene-styrene copolymer foam.

7. The method of claim 1 wherein said thermoplastic foam is polyethylene foam.

References Cited

UNITED STATES PATENTS

| | | | |
|---|---|---|---|
| 2,838,801 | 6/1958 | De Long et al. | 260—2.3 |
| 3,607,999 | 9/1971 | Corbett et al. | 260—2.3 |

JOHN C. BLEUTGE, Primary Examiner

C. J. SECCURO, Assistant Examiner

U.S. Cl. X.R.

260—2.5 E; 264—37, 321, 340, 349